(12) United States Patent
Noda et al.

(10) Patent No.: US 7,853,111 B2
(45) Date of Patent: Dec. 14, 2010

(54) TWO-DIMENSIONAL PHOTONIC CRYSTAL

(75) Inventors: Susumu Noda, Kyoto (JP); Takashi Asano, Kyoto (JP); Seiichi Takayama, Chuo-ku (JP); Hitoshi Kitagawa, Ota-ku (JP)

(73) Assignees: Kyoto University, Kyoto (JP); TDK Corporation, Tokyo (JP); ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/591,299

(22) PCT Filed: Mar. 4, 2005

(86) PCT No.: PCT/JP2005/003796
§ 371 (c)(1),
(2), (4) Date: Aug. 31, 2006

(87) PCT Pub. No.: WO2005/085911
PCT Pub. Date: Sep. 15, 2005

(65) Prior Publication Data
US 2007/0172188 A1    Jul. 26, 2007

(30) Foreign Application Priority Data
Mar. 5, 2004  (JP) .............................. 2004-061737

(51) Int. Cl.
*G02B 6/10* (2006.01)
(52) U.S. Cl. ...................................... 385/129; 385/132
(58) Field of Classification Search ................. 385/129, 385/132
See application file for complete search history.

(56) References Cited

U.S. PATENT DOCUMENTS 6,711,200 B1 *   3/2004   Scherer et al. ................ 372/64

(Continued)

FOREIGN PATENT DOCUMENTS

EP          1 136 853 A1    9/2001

(Continued)

OTHER PUBLICATIONS

H. Kitagawa et al., "Absolute photonic bandgap in two-dimensional photoic crystal slabs." Preprints of the 50th Joint Symposia on Applied Physics, Japan Society of Applied Physics, 28a-YN-10, p. 1129, Mar. 2003.

(Continued)

*Primary Examiner*—K. Cyrus Kianni
(74) *Attorney, Agent, or Firm*—Oliff & Berridge, PLC

(57) ABSTRACT

The present invention provides a two-dimensional photonic crystal in which an absolute photonic band gap (PBG), i.e. a photonic band gap that is effective for both the TE-polarized light and the TM-polarized light within a predetermined wavelength range, is created with an adequate bandwidth. The body 21 is provided with holes 22 arranged in a triangular lattice pattern, where the basic shape of the hole is an equilateral triangle. This shaping and arranging of the holes creates an absolute PBG. Each corner of the equilateral triangle is cut along an arc to leave an adequate distance between the neighboring holes (i.e. an adequate width of the connecting portion of the body). This design makes it possible to enlarge each hole 22 while ensuring an adequate strength of the two-dimensional photonic crystal. This construction creates an absolute PBG having a large width.

9 Claims, 5 Drawing Sheets

(a)

(b)

U.S. PATENT DOCUMENTS

| | | | |
|---|---|---|---|
| 6,738,551 B2 | 5/2004 | Noda et al. | |
| 6,804,446 B1* | 10/2004 | Nordin et al. | 385/132 |
| 6,901,194 B2* | 5/2005 | Charlton et al. | 385/122 |
| 6,990,282 B2* | 1/2006 | Russell et al. | 385/125 |
| 2002/0009277 A1 | 1/2002 | Noda et al. | |
| 2003/0059185 A1* | 3/2003 | Russell et al. | 385/125 |
| 2003/0068152 A1 | 4/2003 | Gunn et al. | |
| 2003/0174940 A1* | 9/2003 | Charlton et al. | 385/27 |
| 2004/0091224 A1* | 5/2004 | Baumberg et al. | 385/129 |
| 2004/0156610 A1* | 8/2004 | Charlton et al. | 385/129 |
| 2005/0226561 A1* | 10/2005 | Romagnoli et al. | 385/39 |
| 2005/0249470 A1* | 11/2005 | Bird et al. | 385/125 |
| 2006/0010921 A1* | 1/2006 | Mori et al. | 65/393 |
| 2006/0133763 A1* | 6/2006 | Dangui et al. | 385/147 |
| 2006/0202125 A1* | 9/2006 | Suhami | 250/368 |
| 2007/0163301 A1* | 7/2007 | Dong et al. | 65/393 |
| 2007/0230885 A1* | 10/2007 | Guan et al. | 385/125 |

FOREIGN PATENT DOCUMENTS

| | | |
|---|---|---|
| JP | A 2000-249828 | 9/2000 |
| JP | A 2001-174652 | 6/2001 |
| JP | A 2001-272555 | 10/2001 |
| JP | A 2002-84037 | 3/2002 |
| JP | B2 3459827 | 8/2003 |
| JP | A 2003-279764 | 10/2003 |
| WO | WO 03/081304 A1 | 10/2003 |

OTHER PUBLICATIONS

Wang, Rongzhou, et al., "Effects of Shapes and Orientations of Scatterers and Lattice Symmetries on the Photonic Band Gap on Two-Dimensional Photonic Crystals," Journal of Applied Physics, Nov. 1, 2001, pp. 4307-4313, vol. 90, No. 9; American Institute of Physics, New York, USA.

Gerard, J.M., et al., "Photonic Bandgap of Two-Dimensional Dielectric Crystals," Solid-State Electronics, Apr. 1, 1994, pp. 1341-1344, vol. 37, Nos. 4-6; Elsevier Science Ltd., Barking, Great Britain.

Frezza, Fabrizio, et al., "Periodic Defects in 2D-PBG Materials: Full-Wave Analysis and Design," IEEE Transactions on Nanotechnology, Sep. 1, 2003, pp. 126-134, vol. 2, No. 3; IEEE Service Center, Piscataway, New Jersey, USA.

Apr. 12, 2010 Communication Pursuant to Article 94(3) EPC issued in European Application No. 05 720 068.5.

* cited by examiner (a)

(b)

TWO-DIMENSIONAL PHOTONIC CRYSTAL

TECHNICAL FIELD

The present invention relates to a two-dimensional photonic crystal used as an optical multiplexer/demultiplexer or other kinds of devices in wavelength division multiplexing (WDM) communication or other techniques. It should be noted that the term "light" or "optical" used in this patent application includes electromagnetic waves in general as well as visible light.

BACKGROUND ART

Optical communication is a technique that could play a central role in future broadband communications. For widespread use of the optical communication, the optical components used in optical communication systems are required to be higher in performance, smaller in size, and lower in price. Optical communication devices using photonic crystals are one of the leading candidates for the next-generation optical communication components that satisfy the aforementioned requirements.

A photonic crystal is a dielectric object having an artificial cyclic structure. Usually, the cyclic structure is created by providing the dielectric body with a cyclic arrangement of modified refractive index areas, i.e. the areas whose refractive index differs from that of the body. Within the crystal, the cyclic structure creates a band structure with respect to the energy of light and thereby produces an energy region in which the light cannot be propagated. Such an energy region is called the "photonic band gap (PBG)". The energy region (or wavelength band) at which the PBG is created depends on the refractive index of the dielectric body and the cycle distance of the cyclic structure.

Introducing an appropriate defect into the photonic crystal creates a specific energy level within the PBG ("defect level"), and only a ray of light having a wavelength corresponding to the defect level is allowed to be present in the vicinity of the defect. This means that a photonic crystal having such a defect can function as an optical resonator that resonates with light having a specific wavelength. Furthermore, forming a linear defect enables the crystal to be used as a waveguide.

Under the condition that the body is a silicon plate and the modified refractive index area is made of air (or a hole), the cyclic distance of the crystal should be 1 μm or smaller for the near infrared light commonly used in modern optical communications, whose wavelength is from 1.25 to 1.65 μm. Manufacturing such small structures requires an accuracy level of the nanometer order. Recent improvements in manufacturing machines have enabled the nanometer-scale working process to be applied to some types of photonic crystals for optical communications, which have already been put into practical use. An example is a photonic crystal fiber for polarization dispersion compensation. Furthermore, recent efforts have had a practical goal of developing optical multiplexers/demultiplexers and other devices that can be used in wavelength division multiplexing.

Patent Document 1 discloses a two-dimensional photonic crystal having a body (or slab) provided with a cyclic arrangement of modified refractive index areas, in which a linear defect of the cyclic arrangement is created to form a waveguide and a point-like defect is created adjacent to the waveguide. This two-dimensional photonic crystal functions as the following two devices: a demultiplexer for extracting a ray of light whose wavelength equals the resonance frequency of the resonator from rays of light having various wavelengths and propagated through the waveguide and for sending the extracted light to the outside; and a multiplexer for introducing the same light from the outside into the waveguide.

Many two-dimensional photonic crystals are designed so that the PBG becomes effective for either a TE-polarized light, in which the electric field oscillates in the direction parallel to the body, or a TM-polarized light, in which the magnetic field oscillates in the direction parallel to the body. For example, if the cyclic structure has a triangular lattice pattern and each modified refractive index area is circular (or cylindrical), the PBG is created for only the TE-polarized light. A waveguide or resonator using such a two-dimensional photonic crystal is almost free from loss as far as the TE-polarized light is used. However, since it has no PBG created for the TM-polarized light, the crystal body allows the TM-polarized light to freely propagate through it. Therefore, if a ray of light containing both kinds of polarized light is introduced into the waveguide or resonator consisting of a two-dimensional crystal, one of the two polarized lights leaks from the waveguide or resonator into the body, which deteriorates the light-propagating efficiency.

Taking the above problem into account, studies have been conducted on a new design of two-dimensional photonic crystal having a PBG for each of the TE-polarized light and the TM-polarized light in which the two PBGs have a common band. This common band is called the "absolute photonic band gap (absolute PBG)" hereinafter. For example, FIG. 1(a) is a plan view of a two-dimensional photonic crystal disclosed in Non-Patent Document 1, which has an absolute PBG created by cyclically arranging triangular (or triangle-pole-shaped) holes 12 in a triangular lattice pattern in the slab 11. Within this two-dimensional photonic crystal, neither the TE-polarized light nor the TM-polarized light can leak from the waveguide, resonator or other device into the body as long as the wavelength of the light is within the absolute PBG. Therefore, the efficiency is maintained.

In the two-dimensional photonic crystal disclosed in Non-Patent Document 1, the absolute PBG can be widened by increasing the filling factor (FF), an area fraction of the holes (i.e. modified refractive index areas) within one lattice unit with respect to the area of the lattice unit. Thus, one can broaden the wavelength band available.

Practically, however, the construction in Non-Patent Document 1 does not allow the FF value to be equal to or larger than 0.5 because the neighboring holes 12 are in contact with each other when the FF value is 0.5, as shown in FIG. 1(b). Moreover, even if the value is smaller than 0.5, a larger FF value makes the connecting portion of the body thinner at each corner of the triangle and thereby weakens the slab 11. Therefore, the FF value practically needs to be equal to or smaller than 0.45. Thus, the construction in Non-Patent Document 1 has limitations relating to the setting range of the absolute PBG and the breadth of the wavelength band available, which depends on the absolute PBG.

[Patent Document 1] Unexamined Japanese Patent Publication No. 2001-272555 ([0023]-[0027], [0032], FIGS. 1, and 5-6)

[Non-Patent Document 1] Hitoshi KITAGAWA et al. "Nijigen Fotonikku Kesshou Surabu Ni Okeru Kanzen Fotonikku Bando Gyappu ("Absolute photonic bandgap in two-dimensional photonic crystal slabs)", Preprints of the 50th Joint Symposia on Applied Physics, Japan Society of Applied Physics, March 2003, p. 1129

DISCLOSURE OF THE INVENTION

Problem to be Solved by the Invention

One objective of the present invention is to provide a two-dimensional photonic crystal having an adequate width of absolute PBG within a desired wavelength band.

MEANS FOR SOLVING THE PROBLEM

To solve the above-described problem, the present invention provides a two-dimensional photonic crystal having a slab-shaped body in which modified refractive index areas, which have the same shape and whose refractive index differs from that of the body, are cyclically arranged, which is characterized in that:

the plane shape of each modified refractive index area is a polygon whose corners are removed.

MODES FOR CARRYING OUT THE INVENTION AND THEIR EFFECTS

According to the present invention, the two-dimensional photonic crystal is created by cyclically arranging modified refractive index areas, which have the same shape, in a slab-shaped body. To create the modified refractive index area, a tangible member whose refractive index differs from that of the body may be embedded into the body. However, it is preferable to make it consisting of air (i.e. a hole) because this design provides a larger difference in refractive index and is easier to manufacture.

According to the present invention, the plane shape of the modified refractive index area is a polygon whose corners are removed.

The polygonal shape makes the two-dimensional structure of the crystal less symmetrical than the circular shape. This leads to the creation of two PBGs for the TE-polarized light and the TM-polarized light. The polygonal shape can be appropriately selected so that the two PBGs have a common band and thereby create an absolute PBG. Examples of the polygon include an equilateral triangle, a square and an equilateral hexagon.

According to the present invention, the corners of the polygon are removed so as to ensure an adequate width of the connecting portion of the body between each corner of the modified refractive index area and that of the neighboring modified refractive index area. This design enables the modified refractive index area, excluding the corner, to be enlarged in order to increase the total area of the modified refractive index areas and thereby obtain a large FF value, while maintaining the two-dimensional photonic crystal at a practically required strength level. Therefore, it is possible to widen the absolute PBG and thereby provide a broader wavelength band available for an optical element or other device than in the case where corners remain. For example, if the plane shape is an equilateral triangle, the conventional FF value theoretically has an upper limit of 0.5, which should be practically 0.45 or lower to ensure an adequate strength of the crystal. In contrast, the FF value in the present invention can be equal to or larger than 0.45, which may be even 0.5 or larger.

One method for removing the corners is to cut each corner along a straight line. However, it is more preferable to cut it along an arc. The reason is as follows: Manufacturing a photonic crystal for infrared light commonly used in modern optical communications, whose wavelength is from 1.25 to 1.65 μm, requires a nanometer-scale working process. For example, if the modified refractive index area is a hole whose plane shape is an equilateral triangle and the central value of the target wavelengths is 1.55 μm, the length of each side of the hole is about 350 nm. If a dry etching process or a similar process is used to work on such a scale, it is difficult to clearly form a sharp corner of the polygon. Therefore, to simplify the process of creating the holes, it is desirable to shape the corner like an arc. Even in the case where the modified refractive index area is not a hole but a tangible member embedded into the body, it is preferable to give the corner an arc shape in order to simplify the working process likewise.

In the present invention, the basic shape of the original polygon must be recognizable even after the corners are removed. For example, suppose that each corner of a triangle is cut along a straight line. If the cutting line is one-third the length of one side, the resultant shape is an equilateral hexagon, so that the basic shape of the equilateral triangle is lost. Therefore, in the present example, the cutting line should be equal to or shorter than one-third the length of one side. In contrast, cutting each corner along an arc leaves the basic shape of the polygon recognizable. This method allows the removed portion of the corner to be larger than in the straight-cutting approach.

In some cases, the modified refractive index areas do not create any common band shared by both the PBG for the TE-polarized light and that for the TM-polarized light. That is, they may not create an absolute PBG even if their shape is polygonal. An example is the modified refractive index areas having a square shape and arranged in a square lattice pattern. In this example, the absolute PBG cannot be created because no PBG opens for the TM-polarized light. However, a PBG opens for the TE-polarized light. Therefore, this crystal structure can be used as a polarization-dependent device that is effective for only the TE-polarized light. If square holes are arranged in a square lattice pattern, the shortest distance between the neighboring holes is from one side to another, as opposed to the case of triangular holes whose shortest distance is from one corner to another. Even in such a case, the present invention is still effective in that the holes can be easily manufactured.

In the two-dimensional photonic crystal according to the present invention, the shape of the modified refractive index areas should preferably have a symmetrical shape that has a trigonal axis and a vertical symmetry plane including the axis. This symmetry can be expressed as "3 m" in Hermann-Mauguin notation or "C3v" in Schoenflies notation. Some of the present inventors have demonstrated that the 3m-symmetrical shape creates an absolute PBG in the two-dimensional photonic crystal. If the modified refractive index areas with the 3m-symmetrical shape have their corners formed like an arc or a similar curve, the two-dimensional photonic crystal has an absolute PBG that is wider than that obtained in the case where the corners are not removed.

EXPLANATION OF NUMERALS 11, 21 . . . . Body (Slab)
12, 22 . . . . Hole
31 . . . PBG for TE-polarized light
32 . . . PBG for TM-polarized light (identical with the absolute PBG)
51 . . . Waveguide
52 . . . Optical Resonator

EMBODIMENTS

Figure 1:
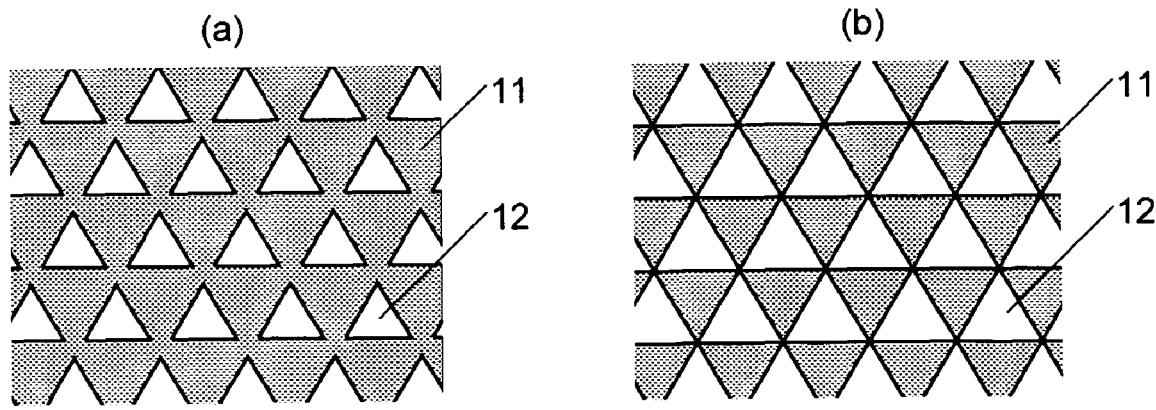
FIG. 1 is a plan view of an example of the conventional two-dimensional photonic crystals.
Figure 2:
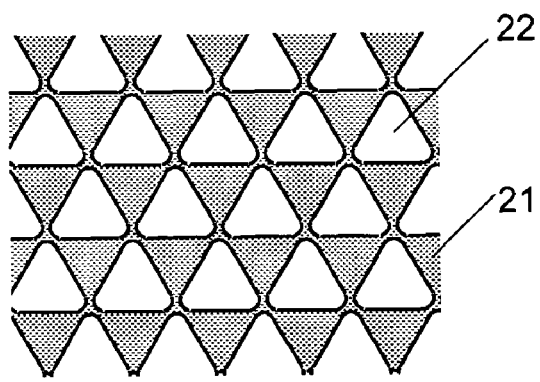
FIG. 2 is a plan view of an embodiment of the two-dimensional photonic crystal according to the present invention.
Figure 3:
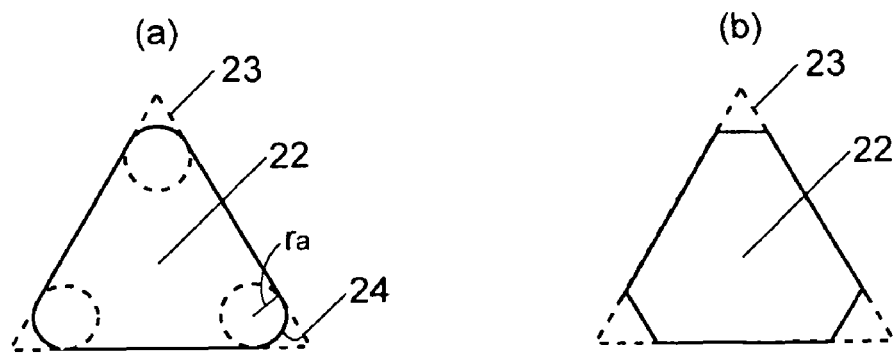
FIG. 3 is an enlarged view of the holes in the two-dimensional photonic crystal of the present embodiment.
Figure 4:
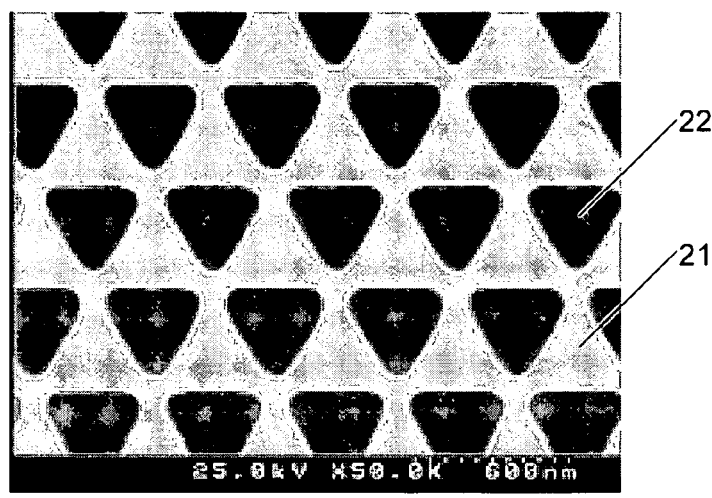
FIG. 4 is an electron-microscopic image of the two-dimensional photonic crystal of the present embodiment.

FIGS. 2 to 4 show an embodiment of the two-dimensional photonic crystal according to the present invention. As shown in FIG. 2, the two-dimensional photonic crystal of the present embodiment consists of a slab-shaped body 21 provided with holes 22 arranged in a triangular lattice pattern. As shown in FIG. 3(*a*), the basic shape of the holes 22 is an equilateral triangle 23 (broken line) whose corners are each removed along an arc 24 of an inscribed circle having a radius of $r_a$.

Alternatively, it is possible to remove each corner along a straight line, as shown in FIG. 3(*b*). However, if an electron-beam drilling process is used to create the hole 22, the arc shape shown in (a) is desirable in that the electron beam leaves a circular edge that can be used as is.

FIG. 4 shows an electron microscopic image of a two-dimensional photonic crystal actually manufactured, which consists of a slab-shaped silicon body 21 provided with neatly arranged holes 22 having an equilateral triangular shape whose corners are each removed along a circular arc. In this two-dimensional photonic crystal, the cycle distance a of the triangular lattice is 460 nm, the radius $r_a$ of the arc is 0.12a (55 nm) and the FF value is 0.42.

Figure 5:
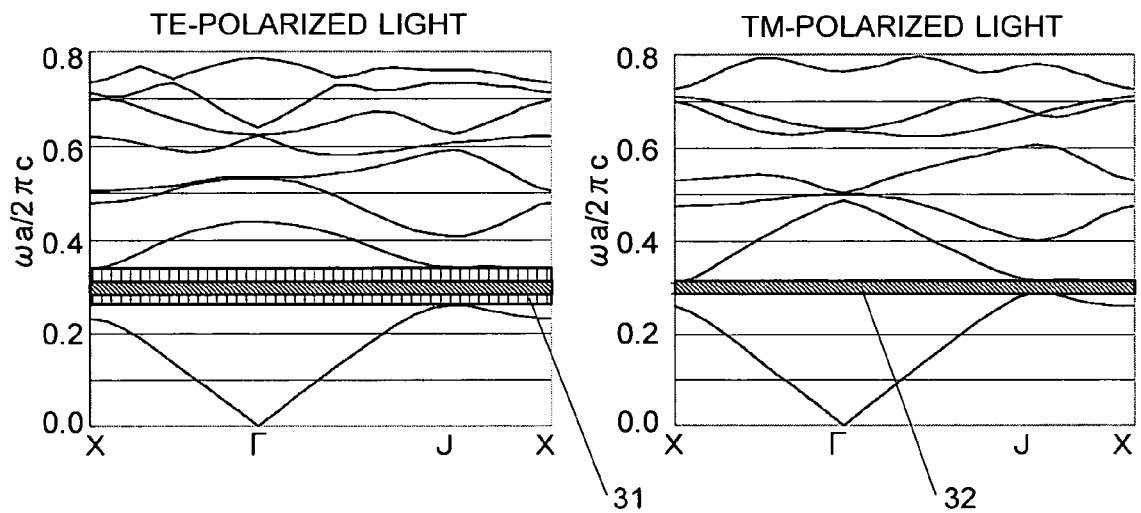
FIG. 5 is a set of graphs showing an example of absolute photonic band gap (absolute PBG).

In the two-dimensional photonic crystal of the present embodiment, each hole is shaped like an equilateral triangle having round corners and has a 3m-symmetrical shape, so that an absolute PBG is created. For this construction, the PBGs for the TE-polarized light and the TM-polarized light have been calculated by a plane wave expansion method under the following conditions: the FF value is 0.43, $r_a$ is 0.15a, the refractive index of the body 21 is 3.46 (i.e. the refractive index of Si), the effective dielectric constant for the TE-polarized light $\epsilon^{TE}$ is 8.92, that for the TM-polarized light $\epsilon^{TM}$ is 6.23, the central point of the wavelength band used (called simply the "central wavelength" hereinafter) is 1.55 µm, and the thickness of the body 21 is 320 nm. It was also assumed that the body was in contact with air on both the upper and lower surfaces. FIG. 5 shows the result of the calculation, wherein a PBG 31 for the TE-polarized light and another PBG 32 for the TM-polarized light are created. The wavelength band of the PBG 32 for the TM-polarized light is entirely overlapped on the PBG 31 for the TE-polarized light. This means that an absolute PBG is present in the wavelength band of the PBG 32 for the TM-polarized light.

Figure 6:
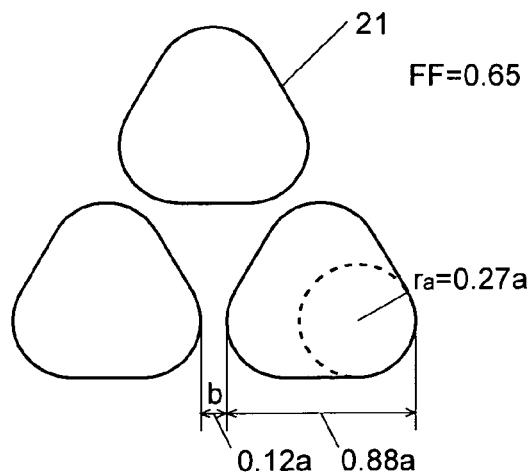
FIG. 6 is a plan view of an example of a cyclic arrangement of holes whose FF value is larger than 0.5.

The present embodiment also has a strength advantage: the arc-shaped corners of the equilateral triangle increase the corner-to-corner distance between the neighboring holes 22. Namely, the connecting portion of the body between the neighboring holes 22 becomes widened. This design enables the FF value to be equal to or larger than 0.45 as a practical upper limit, which can be even larger than 0.5. FIG. 6 shows an example of such a design, in which $r_a$ is 0.27a and the FF value is 0.65. In this example, through the FF value is larger than 0.5, the connecting portion of the body still has a width b=0.12a between the neighboring holes 22.

Figure 7:
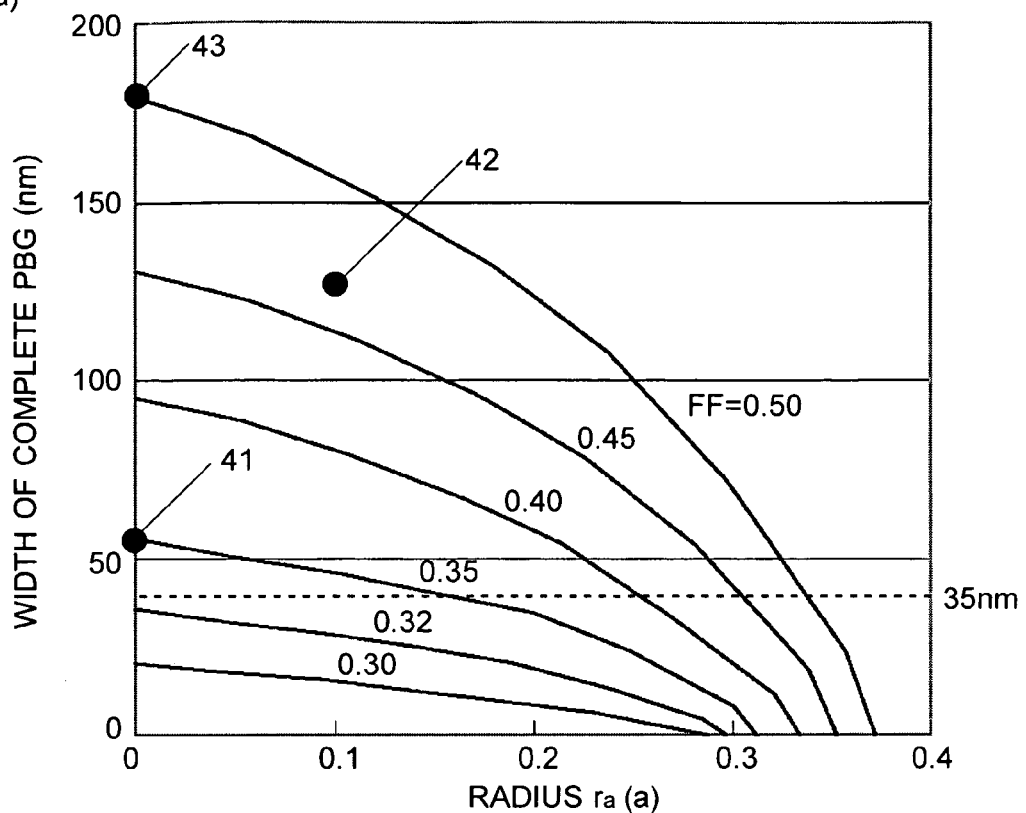
FIG. 7 is a graph showing the widths of absolute PBGs calculated for various FF values and radii $r_a$.
Figure 7:
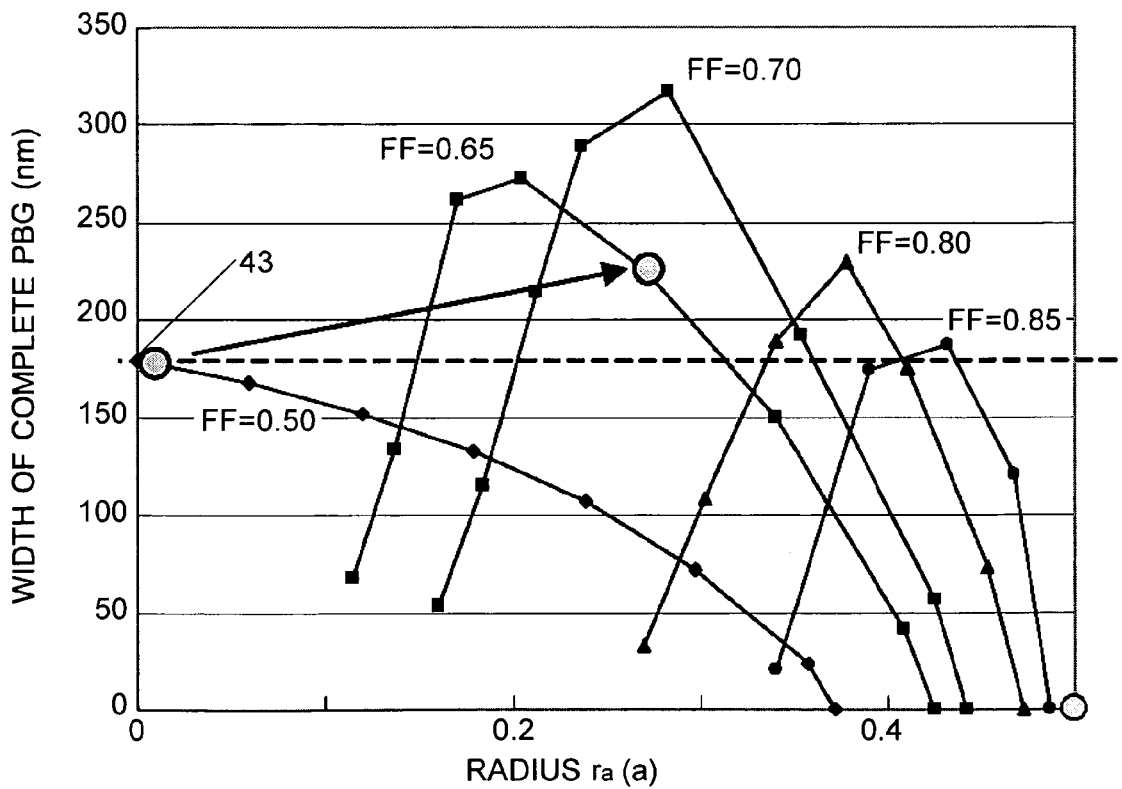

FIG. 7 shows the widths of the absolute PBGs calculated for various FF values and radii $r_a$ under the condition that the refractive index of the body is 3.46 and the central wavelength is 1.55 µm. FIG. 7(*a*) shows the case where the FF values are from 0.30 to 0.50 and FIG. 7(*b*) shows the case where the FF values are from 0.50 to 0.85. The vertical axis of FIG. 7(*b*) is scaled down from that of FIG. 7(*a*). Basically, the absolute PBG tends to be wider as the FF value becomes smaller if the radius $r_a$ is fixed, whereas it tends to be narrower as the radius $r_a$ becomes larger if the FF value is fixed. If the FF value is equal to or larger than 0.35, it is possible to create a absolute PBG whose width is equal to or larger than 35 nm, i.e. the width of the C band used in the WDM (from 1.530 to 1.565 µm in wavelength), by setting the radius $r_a$ equal to or smaller than a specific value (the range above the broken line in FIG. 7(*a*)).

The following description focuses on how the radius $r_a$ of the arc-shaped corner and the FF-value influence the width of the absolute PBG (wavelength range). If the FF value is fixed, an increase in $r_a$ causes a decrease in the width of the absolute PBG. However, the increase in $r_a$ also makes it possible to use an equilateral triangle having a larger basic size so as to raise the FF value to a level where the absolute PBG is widened enough to overcome the aforementioned decrease. For example, compare the following cases: (i) the hole has an equilateral triangular shape (FF=0.35), and (ii) the hole has an equilateral triangular shape with arc-shaped corners (FF=0.47). The shortest distance b between the corners of the neighboring holes is 0.15a in both cases. It can be said that the two cases have little or no difference in the strength of the two-dimensional photonic crystal because they have the same shortest distance b between the corners, i.e. the same width of the connecting portion of the body. As shown in FIG. 7(*a*), the width of the absolute PBG is about 55 nm in case (i) (point 41), whereas the width in case (ii) is much larger: about 130 nm (point 42).

As can be seem from the graph in FIG. 7(*a*), the absolute PBG created by the conventional method has a theoretical upper limit of about 180 nm (point 43) because the FF value must be smaller than 0.5. In contrast, the present invention allows the FF value to be equal to or larger than 0.5, so that the absolute PBG can be wider, as shown in FIG. 7(*b*).

With the FF value equal to or larger than 0.5, the absolute PBG tends to be narrow within a range where $r_a$ is small. Furthermore, if the FF value is equal to or larger than 0.7, the absolute PBG becomes narrower within the entire range of $r_a$ as the FF value becomes larger. However, if the FF value is equal to or smaller than 0.85, one can obtain an absolute PBG wider than the conventional theoretical upper limit (i.e. point 43) by appropriately setting $r_a$ (the area above the broken line in FIG. 7(*b*)).

Figure 8:
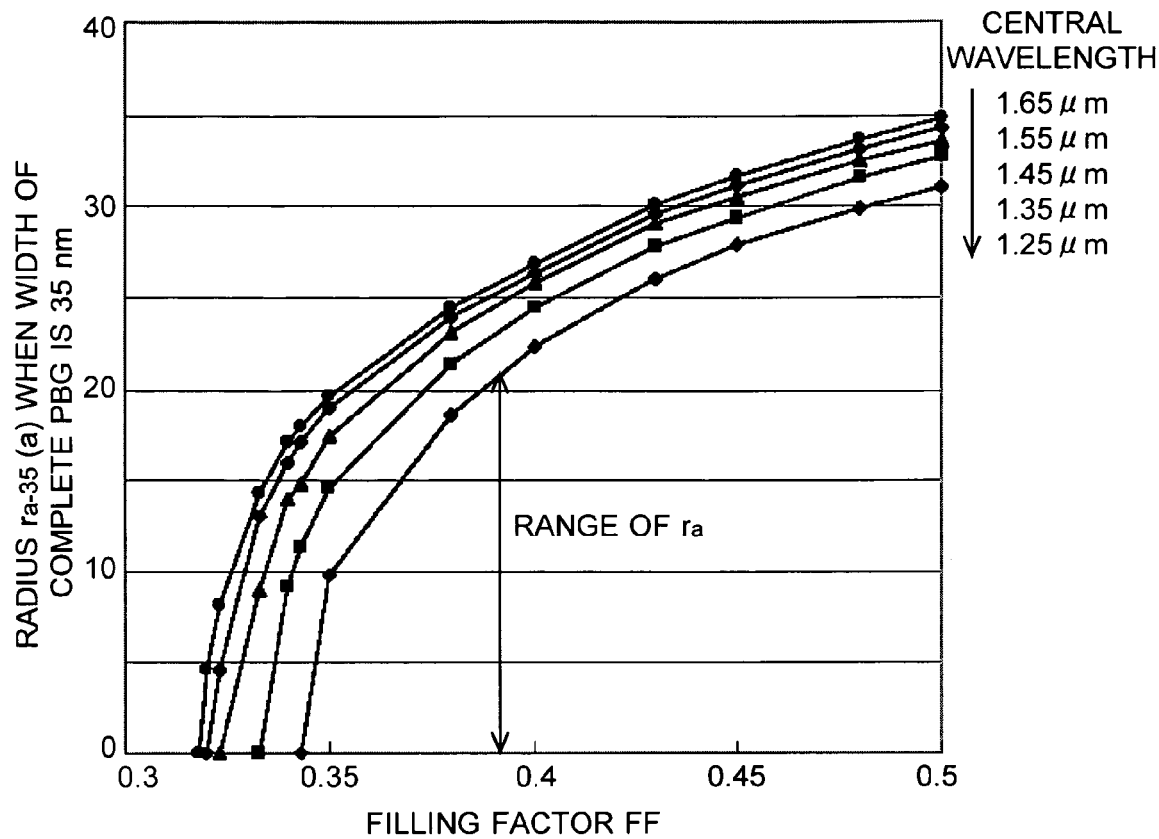
FIG. 8 is a graph showing the result of a calculation of $r_{a-35}$, a radius that creates an absolute PBG having a width of 35 nm.

WDM communications use a bandwidth of 35 nm with the central wavelength between 1.25 and 1.65 µm. Accordingly, in the construction shown in FIG. 2, the radius $r_{a-35}$ that creates an absolute PBG having a width of 35 nm has been calculated for several values of the central wavelength and for various FF values. The result is shown in FIG. 8. The calculation assumed that the refractive index was 3.46, and the results are approximately identical if the refractive index is within the range from 3.15 to 3.55. For each central wavelength, any absolute PBG that is created within the area below the points shown in FIG. 8, i.e. the area where the radius is smaller than the aforementioned points, will have a width equal to or larger than the required value: 35 nm. The $r_{a\text{-}35}$ becomes smaller as the central wavelength becomes shorter. Accordingly, using the calculated values of $r_{a\text{-}35}$ corresponding to the shortest central wavelength within the aforementioned range, i.e. 1.25 μm, a fitting calculation has been performed to determine the best-fit function in the following form:

$$f(FF)=\alpha(FF-\delta)^{0.5}+\beta(FF-\delta)+\gamma(FF-\delta)^2 \quad (1)$$

where α β γ and δ are fitting parameters. The result was that the function best fit with the experiment data when α=1.23, β=−0.28, γ=1.03 and δ=0.34. Therefore, if the central wavelength is 1.25 μm, one can obtain a two-dimensional photonic crystal having an absolute PBG equal to or wider than 35 nm by setting the FF value and $r_a$ so that they satisfy the following equation:

$$0<r_a<[1.23(FF-0.34)^{0.5}-1.28(FF-0.34)+1.03(FF-0.34)^2] \quad (2)$$

If the central wavelength is longer than 1.25 μm, the right-hand side of equation (2) becomes larger than when the central wavelength is 1.25 μm. Therefore, if the central wavelength is within the above range (from 1.25 to 1.65 μm), the two-dimensional photonic crystal can have an absolute PBG having a width of 35 nm or larger as long as $r_a$ is at least within the range defined by the equation (2). Of course, it is possible to perform a similar calculation for a different central wavelength in order to determine the setting range of $r_a$ that can be chosen for the given wavelength.

In the above embodiment, the basic shape is an equilateral triangle and each corner is cut along a circular arc. Even if the basic shape is a square, hexagon or similar shape, the present invention can be applied so as to increase the FF value while maintaining an adequate distance between the corners of the neighboring holes. However, using the equilateral triangle as the basic shape is more desirable because it is a 3m-symmetrical shape. The shape of the corner, which is a circular arc in the above embodiment, may be an elliptical arc or any other shape.

Figure 9:
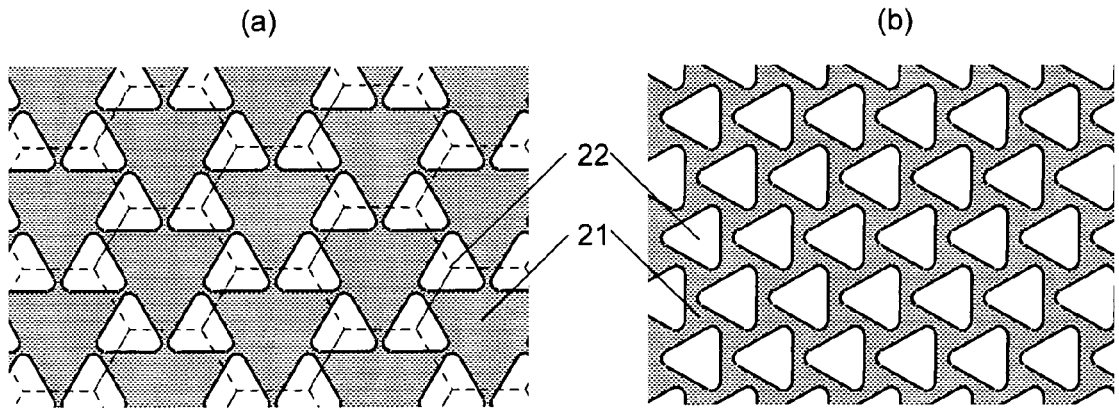
FIG. 9 is a plan view of other embodiments of the two-dimensional photonic crystal according to the present invention.

In the above embodiment, the holes (lattice points) were arranged in a triangular lattice pattern. FIG. 9(*a*) shows another example, in which the holes 22 are arranged in a hexagonal honeycomb pattern. In still another example shown in FIG. 9(*b*), the holes are arranged in a triangular lattice pattern, as in FIG. 2, but each hole is turned by the same angle (30 degrees in the present example) with respect to the lattice. In any of these examples, the holes have a 3m-symmetrical shape. Therefore, it is possible to increase the FF value while maintaining the distance between the neighboring holes (i.e. the strength of the photonic crystal).

Figure 10:
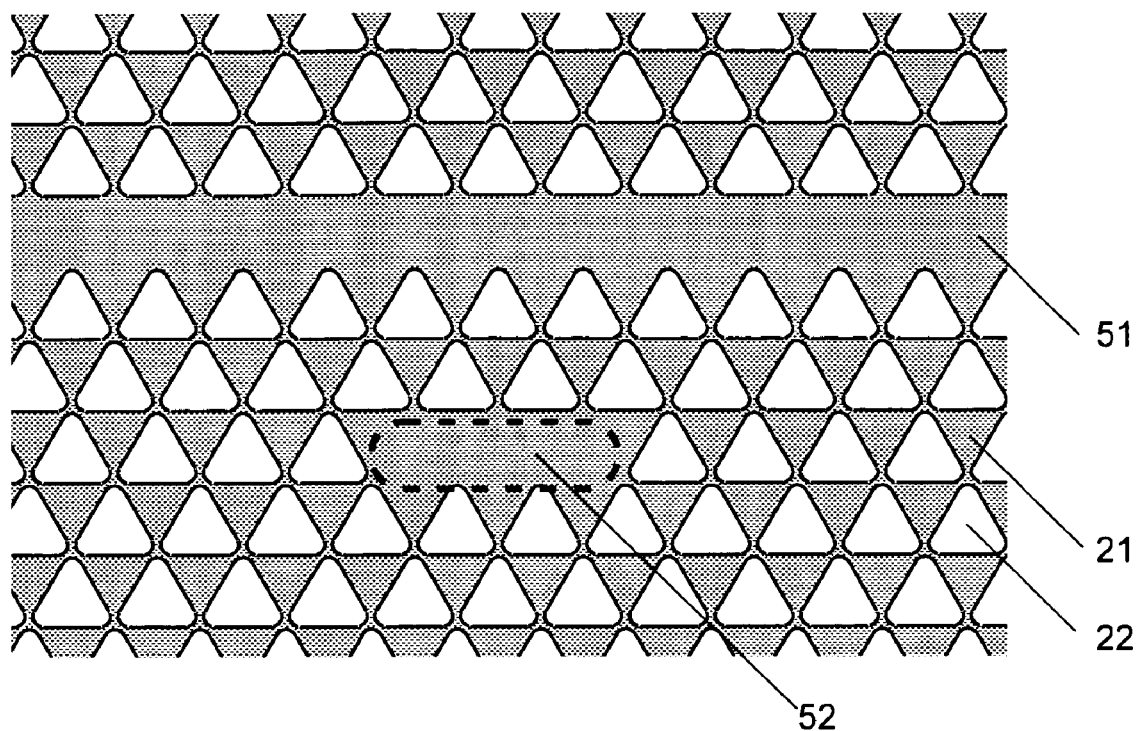
FIG. 10 is a plan view showing an example of an optical multiplexer/demultiplexer consisting of a two-dimensional photonic crystal according to the present invention.

FIG. 10 shows an example of the optical multiplexer/demultiplexer embodied by a two-dimensional photonic crystal according to the present invention. A hole 22 at a given lattice point can be transformed into a defect by omitting the hole 22 or by changing the size or shape of that hole from that of the other holes. The waveguide 51 consists of these defects formed along a straight line. Preferably, the waveguide 51 should be created by omitting the holes 22 (rather than changing the size or shape of the holes 22) in order to prevent the leakage of light in the direction perpendicular to the face of the body 21. In the vicinity of the waveguide 51, a point-like defect of the holes 22 is created as an optical resonator 52. The point-like defect may consist of a single hole omitted. Alternatively, it is also possible to obtain a single optical resonator by creating multiple defects of the holes located close to each other. With the waveguide 51 and the optical resonator 52 thus created, the present two-dimensional photonic crystal functions as a demultiplexer for extracting a specific wavelength of light from the light flowing through the waveguide 51 and for sending the extracted light from the waveguide 51 through the optical resonator 52 to the outside, or as a multiplexer for introducing a specific wavelength of light from the outside through the optical resonator 52 into the waveguide 51.

The present optical multiplexer/demultiplexer is identical to those disclosed in Patent Document 1 or the Unexamined Japanese Patent Publication No. 2003-279764 except for the shape of the hole and its effects. Accordingly, it should be understood that the present invention includes any device that can be obtained by applying the hole shape of the present invention to the various constructions of optical multiplexers/demultiplexers disclosed in the aforementioned documents.

The invention claimed is:

1. A two-dimensional photonic crystal having a slab-shaped body in which modified refractive index areas are cyclically arranged and composed of holes passing through the slab-shaped body, the modified refractive index areas having the same shape and having a refractive index that differs from that of the body, wherein:

a plane shape of each modified refractive index area is a polygon whose corners are removed and an area fraction FF of the modified refractive index areas in the body is equal to or larger than 0.5 and is equal to or smaller than 0.85; wherein a portion of the body between the modified refractive index areas has a polygon shape.

2. The two-dimensional photonic crystal according to claim 1, wherein:

the modified refractive index area has a 3m-symmetrical shape.

3. The two-dimensional photonic crystal according to claim 2, wherein:

the polygon is an equilateral triangle.

4. The two-dimensional photonic crystal according to claim 1, wherein:

the corners are removed along an arc.

5. The two-dimensional photonic crystal according to claim 4, wherein:

the modified refractive index areas are arranged in a triangular lattice pattern;

the polygon is an equilateral triangle;

the refractive index of the body is within a range from 3.15 to 3.55; and a radius $r_a$ of the arc satisfies a following equation:

$$0<r_a<[1.23(FF-0.34)^{0.5}-1.28(FF-0.34)+1.03(FF-0.34)^2],$$

where FF is an area fraction of the modified refractive index areas in the body.

6. The two-dimensional photonic crystal according to claim 1, wherein:

each modified refractive index area consists of holes.

7. An optical waveguide device, comprising:

a two-dimensional photonic crystal according to claim 1, in which a linear defect of the modified refractive index areas is created.

8. An optical resonator device, comprising:

a two-dimensional photonic crystal according to claim 1, in which a point-like defect of the modified refractive index areas is created.

9. An optical multiplexer/demultiplexer, comprising:

a two-dimensional photonic crystal according to claim 1;

at least one optical waveguide including a linear defect of the modified refractive index areas created in the two-dimensional photonic crystal; and at least one optical resonator including a point-like defect of the modified refractive index areas created in a vicinity of the optical waveguide.

* * * * *

UNITED STATES PATENT AND TRADEMARK OFFICE
CERTIFICATE OF CORRECTION

PATENT NO. : 7,853,111 B2
APPLICATION NO. : 10/591299
DATED : December 14, 2010
INVENTOR(S) : Susumu Noda et al.

It is certified that error appears in the above-identified patent and that said Letters Patent is hereby corrected as shown below:

Title Page
Please delete the following:

"(75) Inventors: Susumu Noda, Kyoto (JP); Takashi Asano, Kyoto (JP); Seiichi Takayama, Chuo-ku (JP); Hitoshi Kitagawa, Ota-ku (JP)"

And Replace with:

(75) Inventors: Susumu Noda, Kyoto (JP); Takashi Asano, Kyoto (JP); Seiichi Takayama, Tokyo (JP); Hitoshi Kitagawa, Tokyo (JP)

Signed and Sealed this
First Day of March, 2011

David J. Kappos
*Director of the United States Patent and Trademark Office*